Jan. 31, 1933.  E. E. HEWITT  1,895,464
FLUID PRESSURE BRAKE DEVICE
Filed March 7, 1931
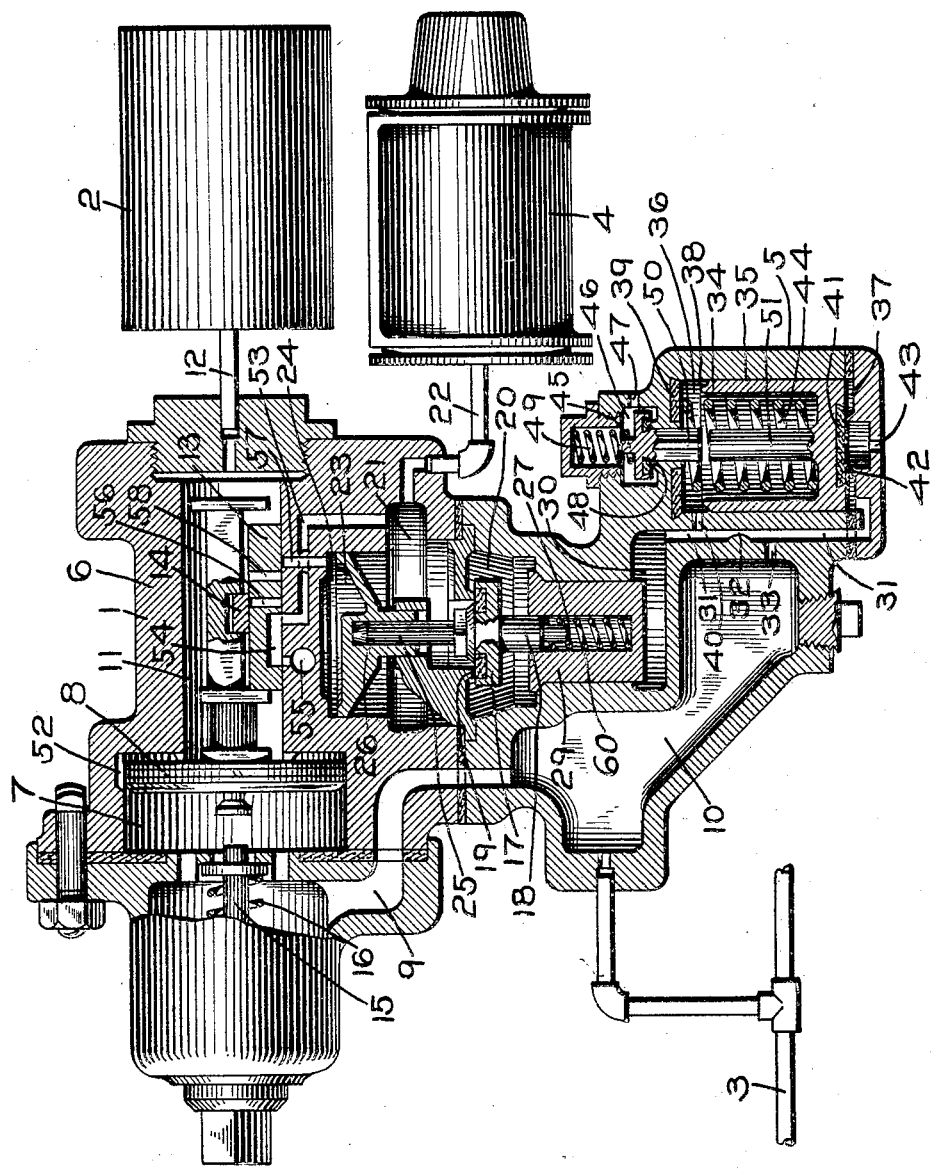
INVENTOR.
ELLIS E. HEWITT
BY *Wm. M. Cady*
ATTORNEY.

Patented Jan. 31, 1933

1,895,464

UNITED STATES PATENT OFFICE

ELLIS E. HEWITT, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE DEVICE

Application filed March 7, 1931. Serial No. 520,789.

This invention relates to fluid pressure brakes, and more particularly to a triple valve device of the quick action type.

The usual quick action triple valve device includes a quick action mechanism which is operated upon movement of the triple valve parts to emergency position under a sudden reduction in brake pipe pressure to vent fluid from the brake pipe to the brake cylinder.

In some instances, such as when the brake pipe is vented to a small brake cylinder volume, the extent the brake pipe is vented may not be sufficient to ensure the desired quick serial action throughout the train.

The principal object of my invention is, therefore, to provide a brake pipe venting means supplemental to the usual quick action mechanism of a triple valve device, so that sufficient fluid will be vented from the brake pipe to ensure quick serial action throughout the train.

Other objects and advantages will appear from the following more detailed description and the appended claims.

In the accompanying drawing, the single figure is a diagrammatic view, partly in section, of a fluid pressure brake equipment embodying the invention.

According to my invention and as illustrated in the drawing, the fluid pressure brake equipment may comprise a triple valve device 1, an auxiliary reservoir 2, a brake pipe 3, a brake cylinder 4, and a brake pipe vent valve 5.

The triple valve device 1 may comprise a casing 6 having a piston chamber 7 containing a piston 8 and connected with the brake pipe 3, through a passage 9 and a chamber 10, and having a valve chamber 11 connected by a pipe 12 to the auxiliary reservoir 2 and containing a main slide valve 13 and a graduating slide valve 14 adapted to be operated by the piston 8. Also contained in the piston chamber 7 is the usual graduating stem 15 and its associated spring 16 which is adapted to arrest the movement of the piston 8 when the brake pipe pressure is reduced under service conditions.

The triple valve device 1 also embodies the usual quick action mechanism which may comprise a vent valve 17 having a valve stem 18 and adapted to engage an annular seat 19. This valve controls communication between a chamber 20 and a chamber 21 which communicates with the brake cylinder 4 through a passage and pipe 22. A quick action piston 23, contained in a piston chamber 24 is adapted to operate the valve 17, said valve having a guide stem 25 which extends into a bore 26 provided in the piston 23. The stem 18 of the valve 17 extends into a bore 27 provided in the usual check valve 29 which controls communication from the chamber 20 and a chamber 30, which latter chamber, in turn, communicates with the chamber 10 through a passage 31, having a restricted or choke portion 32 therein, and a passage 33. The piston 23 is urged toward its innermost position and the vent valve 17 and the check valve 29 are biased toward their closed positions, by a spring 60 disposed within the bore 27 for engagement with the adjacent end of the stem 18.

The brake pipe vent valve device 5 preferably comprises a valve piston 34 slidably mounted in a cylindrical bore 35 which provides a chamber 36 at one end and a chamber 37 at the other end thereof which is in constant communication with the passage 31. One end of the valve piston 34 is formed with an annular seat portion 38 adapted to engage a seat 39 in the adjacent end wall of the cylindrical bore 35. A passage 40 connects passage 31 with the chamber 36. The other end of the valve piston 34 carries a seat portion 41 for engagement with an annular seat rib 42 to control communication between the chamber 37 and the atmosphere through a port 43. Normally, the valve piston 34 is yieldably maintained in a position in which it uncovers the passage 40 and closes the port 43, by a coil spring 44 which is interposed between the valve piston 34 and the seat 39. A relief valve 45 controls communication between the chambers 36 and a chamber 46 which communicates with atmosphere through a port 47. This valve is urged into seating engagement with an annular seat rib 48 by a coil spring 49 and is provided with a fluted stem 50 for engagement by a stem 51 carried by the valve piston 34.

In operation, when the brake pipe is charged with fluid under pressure, fluid flows from the brake pipe through chamber 10 and passage 9 to piston chamber 7, moving the piston 8 to release position, in which the usual feed groove 52 is opened to permit flow of fluid from piston chamber 7 to valve chamber 11, thus charging said chamber and the auxiliary reservoir 2 with fluid at brake pipe pressure. In the release position of slide valve 14, the brake cylinder 4 is connected to the atmosphere through pipe 22, chamber 21, passage 53, cavity 54 in main slide valve 13, and atmospheric exhaust port 55. Fluid at brake pipe pressure is also supplied from the chamber 10, through the passages 33 and 31 to the chamber 37 on one side of the valve piston 34 and through the choke 32 and passage 40 to the chamber 36 on the other side of this valve. Both sides of the valve piston 34 being thus subjected to brake pipe pressure, the spring 44 maintains the valve piston in a position in which it closes the atmospheric port 43.

If it is desired to make a service application of the brakes after the equipment has been fully charged, as described above, a gradual reduction in brake pipe pressure is effected in the usual manner, and the higher auxiliary reservoir pressure shifts the piston 8 from its full release position toward its service position. This movement of the piston 8 first moves the graduating slide valve 14 to a position in which it uncovers a passage 56 in the main slide valve 13 and then moves the main slide valve 13 to a position in which the passage 56 therein registers with the passage 53. Fluid under pressure is thus permitted to flow from the auxiliary reservoir 2, through pipe and passage 12, valve chamber 11, passage 56 in the main slide valve 13, passage 53, chamber 21, and passage and pipe 22 to the brake cylinder 4 and results in a service application of the brakes.

If, however, an emergency application of the brakes is desired, a sudden reduction in brake pipe pressure is effected, but in this case the increased pressure differential causes the piston 8 to move to its extreme outer position. This movement of the piston 8 moves the main slide valve 13 to a position in which it uncovers a passage 57 and also in which a passage 58 in the main slide valve 13 registers with the passage 53. Fluid under pressure is thus admitted to the brake cylinder 4 from the auxiliary reservoir 2 at an emergency rate.

Fluid under pressure supplied through passage 57 causes the piston 23 to be shifted downwardly, so that the vent valve 17 is thereby uncovered. Fluid is then vented from the brake pipe past the check valve 29 to chamber 20, and flow thence past the unseated valve 17 to chamber 21 and the brake cylinder 4.

Fluid is also vented from the chamber 36, through passage 40 and passage 31 to the brake cylinder and by reason of the choke 32, the pressure in chamber 36 is reduced more rapidly than the brake pipe pressure is reduced, and since brake pipe pressure acts on the exposed area of valve piston 34 in chamber 37, as supplied thereto through passages 33 and 31, the valve piston will be shifted upwardly, against the pressure of spring 44.

The upward movement of the valve piston 34 causes the stem 51 thereof to engage the stem 50, so that the valve 45 is unseated and thereby the chamber 36 is opened to the atmosphere through the port 47. The quick reduction in pressure in chamber 36 causes the rapid movement of the valve piston 34 into engagement with its seat 39, in which position, the communication from passage 40 to chamber 36 is cut off, while said chamber is maintained at atmospheric pressure.

The upward movement of the valve piston 34 opens communication from passage 31 to the atmospheric vent port 43, so that fluid is vented from the brake pipe by way of passages 33 and 31 to the atmosphere. The vent port 43 is thus maintained open until the brake pipe pressure is reduced to a value less than that exerted by the spring 44, at which point this spring returns the valve piston 34 to its normal position, hereinbefore described.

In order to release the brakes after an application thereof as above described, fluid under pressure is supplied to the brake pipe 3 and piston chamber 7, which shifts the piston 8 and slide valves 13 and 14 back to their release positions against the reduced auxiliary reservoir pressure in chamber 11.

It will be apparent from the foregoing that when the brake pipe pressure is reduced under emergency conditions, the brake pipe vent valve device quickly responds to the action of the triple valve and vents the brake pipe directly to atmosphere. This sudden local venting of the brake pipe in addition to the usual venting of fluid from the brake pipe to the brake cylinder by operation of the usual quick action mechanism not only insures the emergency action of all of the triple valves on the other cars of the train, but effects a rapid propagation of such action throughout the length of the train.

While only one illustrative embodiment of the invention has been described in detail, it is not my intention to limit its scope to this particular embodiment or otherwise than by the terms of the appended claims.

Having now described my invention, what I claim as new and desire to secure by Letters Patent, is:

1. In a fluid pressure brake, the combination with a brake pipe, a triple valve device, and a quick action valve mechanism controlled by said triple valve device upon a sudden reduction in brake pipe pressure for venting fluid from the brake pipe, of valve means normally subject to opposing fluid pressures and operated by venting fluid from one side, to vent fluid from the brake pipe, the venting of fluid from said valve means being effected by said quick action valve mechanism.

2. In a fluid pressure brake, the combination with a brake pipe, a triple valve device, and a quick action valve mechanism controlled by said triple valve device upon a sudden reduction in brake pipe pressure for venting fluid from the brake pipe, of valve means normally subject to opposing fluid pressures and operated by venting fluid from one side, to vent fluid from the brake pipe, the venting of fluid from said valve means being effected by said quick action valve mechanism, and a valve operated by said valve means for also venting fluid from said valve means.

3. In a fluid pressure brake, the combination with a brake pipe, a triple valve device, and a quick action valve mechanism controlled by said triple valve device upon a sudden reduction in brake pipe pressure for venting fluid from the brake pipe, of valve means normally subject on opposite sides to brake pipe pressure, and operated by the venting of fluid from one side by the operation of said quick action valve mechanism to vent fluid from the brake pipe, the venting of fluid from the brake pipe by way of said quick action valve mechanism being through a restricted port.

4. In a fluid pressure brake equipment comprising a brake pipe, an auxiliary reservoir, a brake cylinder, a triple valve having a quick acting mechanism for venting said brake pipe to said brake cylinder upon a sudden reduction in brake pipe pressure, and a valve normally subject to brake pipe pressure on both sides thereof for venting said brake pipe to atmosphere and operable by a pressure differential on opposite sides thereof caused by the operation of said quick acting mechanism.

5. In a fluid pressure brake, the combination with a brake pipe, a quick action valve device operative to vent fluid under pressure from the brake pipe, and a triple valve device operated upon a sudden reduction in brake pipe pressure for effecting the operation of said quick action valve device, of a supplemental valve means operated upon venting fluid from the brake pipe for opening an additional communication for venting fluid from the brake pipe, and means for operating said valve means to close said communication upon a predetermined reduction in brake pipe pressure.

6. In a fluid pressure brake, the combination with a brake pipe, a quick action valve device operative to vent fluid under pressure from the brake pipe, and a triple valve device operated upon a sudden reduction in brake pipe pressure for effecting the operation of said quick action valve device, of a supplemental valve means operated upon venting fluid from the brake pipe for opening an additional communication for venting fluid from the brake pipe, and a spring for operating said valve means to close said communication upon a predetermined reduction in brake pipe pressure.

In testimony whereof I have hereunto set my hand, this 3rd day of March, 1931.

ELLIS E. HEWITT.